United States Patent
Ottesen et al.

(10) Patent No.: US 6,560,054 B1
(45) Date of Patent: May 6, 2003

(54) GENERATION OF A FIXED ANGULAR DISK POSITION INDEX IN A DASD USING A SENSORLESS SPINDLE MOTOR

(75) Inventors: Hal Hjalmar Ottesen, Rochester, MN (US); Gordon James Smith, Rochester, MN (US)

(73) Assignee: Hitachi Global Storage Technologies, Amsterdam (NL)

(*) Notice: Subject to any disclaimer, the term of this patent is extended or adjusted under 35 U.S.C. 154(b) by 420 days.

(21) Appl. No.: 09/598,235

(22) Filed: Jun. 21, 2000

(51) Int. Cl.[7] ................................................. G11B 5/00
(52) U.S. Cl. ..................... 360/51; 360/75; 360/73.03; 360/77.08; 360/78.14
(58) Field of Search ............................. 360/49, 51, 75, 360/73.03, 77.08, 78.14; 318/560, 606, 608

(56) References Cited

U.S. PATENT DOCUMENTS 5,491,593 A * 2/1996 Donaldson ............... 360/73.03
5,978,170 A * 11/1999 Izumiya et al. ............. 360/51
6,388,833 B1 * 5/2002 Golowka et al. ............ 360/51
6,404,582 B1 * 6/2002 Miranda ..................... 360/49

* cited by examiner

Primary Examiner—Alan T. Faber
(74) Attorney, Agent, or Firm—Bracewell & Patterson LLP; James R. Nock (57) ABSTRACT

A method of indexing a rotatable disk in a direct access storage device (DASD) having a sensorless spindle motor, by monitoring spindle motor voltage to detect a pattern of commutation spikes timing separations, identifying a spindle motor index from the commutation spike pattern, and matching the spindle motor index with a servo sector index of the disk. A highpass filter is connected to a voltage output of the spindle motor, and an output of the filter is connected to a threshold triggering device. A timing-separation sequence is determined by counting clock pulses, and variations in the timing-separation sequence are compared. The rotor magnets of the spindle motor may be arranged asymmetrically to produce a large deviation in the variation of the timing-sequence. Indexing may be accomplished during servo track write for the disk.

17 Claims, 7 Drawing Sheets

GENERATION OF A FIXED ANGULAR DISK POSITION INDEX IN A DASD USING A SENSORLESS SPINDLE MOTOR

BACKGROUND OF THE INVENTION

1. Technical Field

The present invention generally relates to computer systems, more specifically, to storage devices such as hard disk drives used by computer systems for the permanent retention of user data and software programs. The invention particularly relates to a method of determining the angular position of one or more rotating disks of such a storage device, to provide proper indexing of the disks with respect to an associated servo mechanism.

2. Description of Related Art

Computer systems use a variety of devices for permanently storing data, i.e., in a non-volatile manner such that power to the computer system may be turned off but the data (including both user information and computer programs) are retained for future access. These direct access storage devices (DASDs) typically use a magnetic or optical medium to preserve the data. The most common data storage device has one or more generally circular disks formed from a non-magnetic substrate with a ferromagnetic coating. The disks rotate or spin, and a pivoting arm having electromagnetic transducers is used to read from, and write to, the disks. This magnetic storage device is commonly referred to as a hard disk drive (HDD), and is usually packaged in a modular enclosure so that it may be easily installed in and removed from the computer system. Many computer systems use multiple HDDs for greater storage capability, or for fault tolerance, such as in a redundant array of inexpensive disks (RAID).

Figure 1:
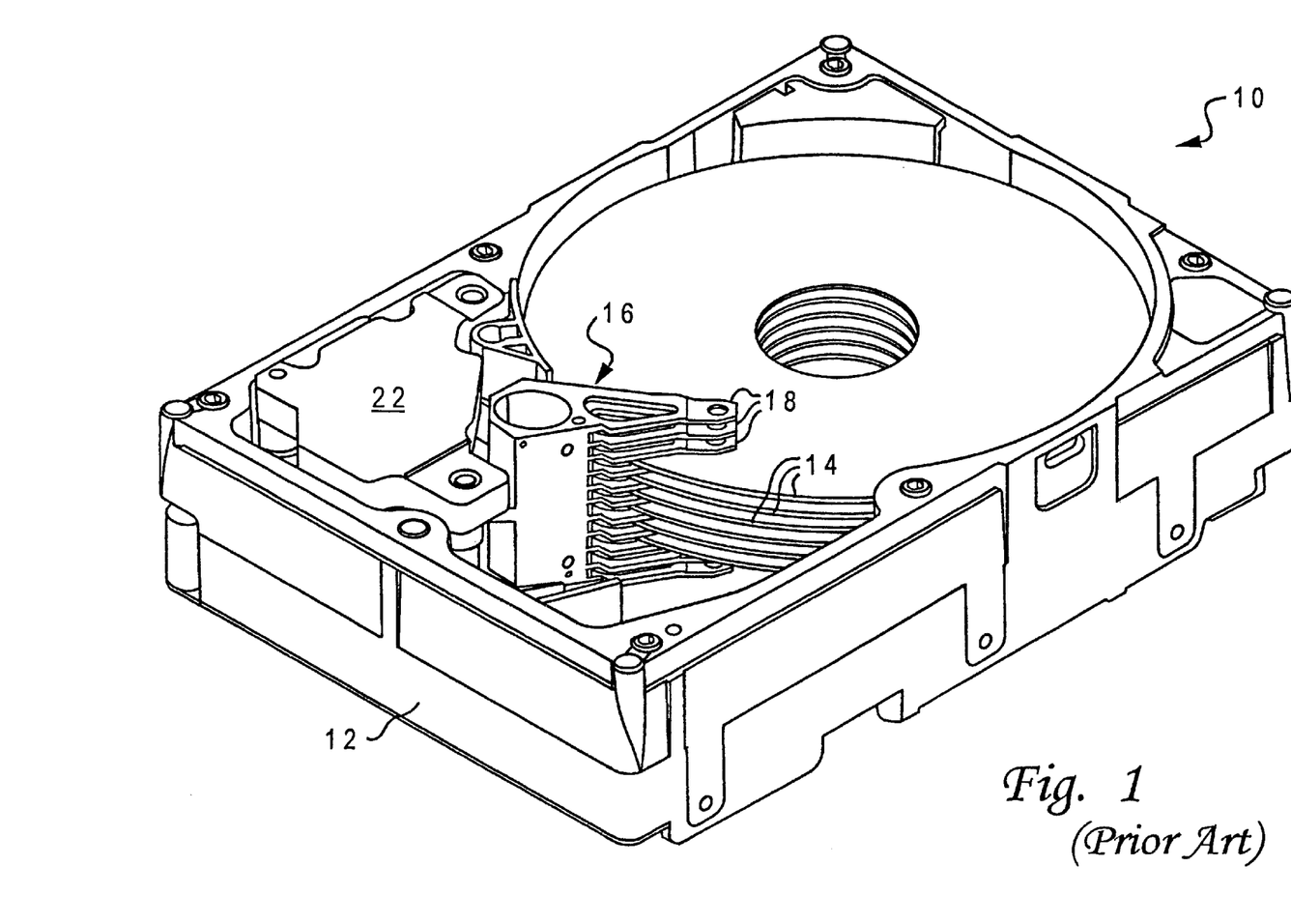
FIG. 1 is a perspective view of a conventional hard disk drive (HDD)

FIG. 1 depicts an exemplary HDD 10 constructed in accordance with the prior art. HDD 10 has a shroud or enclosure 12, a plurality of disks 14, a rotary actuator assembly 16, and associated control electronics (not shown). A cover which is part of enclosure 12 has been removed in FIG. 1. Disks 14 are appropriately mounted on a spindle which is attached to a spindle motor, and thus rotatable with respect to enclosure 12.

The upper and lower surfaces of each of the disks 14 are coated with a magnetic material to allowing the writing of data onto the surfaces using the principle of magnetic induction. Rotary actuator assembly 16 has a plurality of arm/suspension members 18 supporting electromagnetic transducers (heads) at their tips, which are used to read data from and write data to the magnetic media-bearing surfaces of disks 14. The movement of actuator assembly 16 is controlled by a voice-coil motor (VCM) 22.

The magnetic media-bearing surfaces of disks 14 have a plurality of generally concentric tracks for recording blocks of information. Each of these tracks is divided into multiple sectors. The theoretical location of any given set of data bits can accordingly be computed based on the track number and position within the particular sector. Based on this assumed location, the HDD control electronics generate appropriate electrical signals that cause VCM 22 to move the read/write heads on arm/suspension members 18 over the desired portions of disks 14. Thus, when the heads have been located over the proper tracks, as the disks 14 are spinning, data can be read from or written to the tracks via the inductive heads.

The magnetic disk of a typical HDD is divided into several different areas according to industry standards. For example, many disks include a master boot record for storing technical specifications of the disk, a boot sector for storing basic operating system data, and multiple tracks for storing other data. The transducers must be precisely aligned with these various areas on the disk in order to properly write to or read from the disk. In the well-known Whitney style technology, the rotary movement and positioning of the actuator assembly is controlled by a series of electrical signals emanating from the computer processor (or from a "controller" connected to the processor), which feed into the VCM of the actuator assembly. The VCM includes an electromagnetic coil (solenoid) attached to a portion of the pivoting arm, and one or more permanent magnets are affixed to the HDD enclosure such that a steady-state magnetic field from the magnets can be used in conjunction with the magnetic field from the VCM coil to cause the arm to rotate about its pivot point in a precise manner. Many HDDs provide a special magnetic pattern, or "servo surface," that allows the actuator assembly to identify its relative location on the disk. In this manner, an actuator assembly can be quickly moved to the approximate desired location, and then precisely adjusted to the exact location.

For such accurate registration of the read/write heads, it is necessary to determine the absolute angular position (index) of a disk with respect to the servo mechanism. In order to perform this determination, it is currently necessary to use some form of sensor. The sensor may itself comprise the read/write heads that are used to access the media-bearing surfaces of the disks. This approach has several problems, however. First, it is of course necessary that the heads have been loaded onto the device, which impacts the manufacturing process. It may be desirable under certain circumstances to effectuate disk indexing prior to mounting of the transducer heads. Moreover, for disk drives which utilize a load/unload feature, one of the heads may be loaded directly on top of a surface defect in the loading zone, thus causing more surface damage. Since a spindle position index is not available when the heads are parked on the ramps, the angular spindle location where the heads load onto the disk surfaces becomes random.

Instead of using the transducer heads to index the disks, an external sensor may be employed. One example is the use of a Hall sensor, but this approach also has problems, particularly the increased cost associated with the use of the external sensor. It would, therefore, be desirable to provide an improved method for determining a fixed rotary position reference of the disks in a disk drive, without requiring the recording heads to be loaded, and without the use of any external sensor. It would be further advantageous if the method could facilitate the location of defects in the loading zone without the use of servo sectors.

SUMMARY OF THE INVENTION

It is therefore one object of the present invention to provide an improved direct access storage device (DASD) for a computer system.

It is another object of the present invention to provide such a DASD which allows the angular position of disks to be established relative to the index for the servo sectors.

It is yet another object of the present invention to provide a method for generating a fixed angular position index of a DASD using a sensorless spindle motor.

The foregoing objects are achieved in a method of indexing a rotatable disk in a direct access storage device (DASD) having a sensorless spindle motor, generally comprising the steps of monitoring a center-tap voltage of the spindle motor to detect a pattern of commutation spike timing separations associated with the sensorless spindle motor, identifying a sensorless spindle motor index from the commutation spike timing separations pattern, and matching the sensorless spindle motor index with a servo sector index of the disk. The center-tap voltage may not be readily available in some spindle motors. In this case, the individual induced motor phase voltages are added by a summing amplifier to provide a voltage signal that is similar to the center-tap voltage. The commutation spikes may be monitored by connecting a center tap of the sensorless spindle motor to an input of a highpass filter, and connecting an output of the highpass filter to a threshold-and-gate device which triggers on a leading edge of a commutation pulse from the highpass filter based on a predetermined threshold level. A plurality of clock pulses are counted as the disk spins, and count values are captured using the threshold-and-gate device. The threshold-and-gate device stores the count values in an index register; a timing-separation sequence between adjacent count values is computed, and variations in the timing-separation sequence are computing by subtracting an average timing-separation from the sequence. A figure-of-merit may be set based on a sliding window used to sum a portion of the sequence, and the difference between the largest value of the sequence and the next largest value of the sequence is enlarged, based on the figure-of-merit. The rotor magnets of the sensorless spindle motor may be placed in an asymmetric fashion to produce a large deviation in the variation of the timing-sequence. Indexing may be accomplished during servo track write for the disk.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

The method of the present invention determines a fixed rotary position reference (index) of the disks in a direct access storage device (DASD), such as the DASD shown in FIG. 1. The reference to the example of FIG. 1 should not, however, be construed in a limiting sense, inasmuch as the invention is applicable to a wide variety of DASD constructions.

In the manufacture of the three-phase spindle motor commonly used in disk drives, various physical error tolerances arise. For example, the physical components used in the rotor, stator, and drive electronics all have compounding tolerances. Manufacturing component assembly processes are known to have tolerances as well. The tolerances of a given three-phase spindle motor with drive electronics will be unique due to the millions of permutations of the various component and manufacturing tolerances. This unique combined tolerance causes distinct variations in the timing-separation between adjacent commutation spikes over one full revolution of a disk, as measured at the center tap.

One common three-phase spindle motor (MAKO) has 24 commutation spikes per revolution. For a spindle motor running at a constant speed of 10,000 RPM, the average separation between the peaks of the 24 commutation spikes is 250 microseconds. When these timing-separations are measured on an actual spindle motor running at a constant speed, one finds a unique distribution in a histogram of the spike timing-separations. A small physical tolerance of only ±25.4 microns in the rotor magnet structure at a radius of 8 millimeters will produce a timing variation of ±3 microseconds between commutation spikes at 10,000 RPM. Maximum variations in the spike timing-separation have been observed to be close to ±10 microseconds for a certain disk drive spindles. Furthermore, the variation in the spike timing-separations show a unique pattern or signature that is generally repeatable for each consecutive revolution.

Figure 2A:
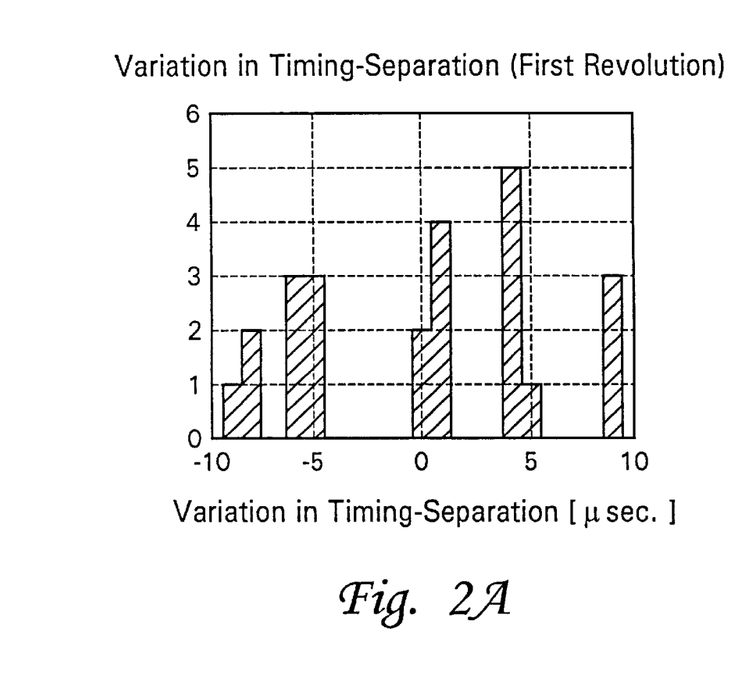
FIG. 2 is a histogram depicting variations in spike timing separation for two consecutive revolutions of a conventional disk drive.
Figure 2B:
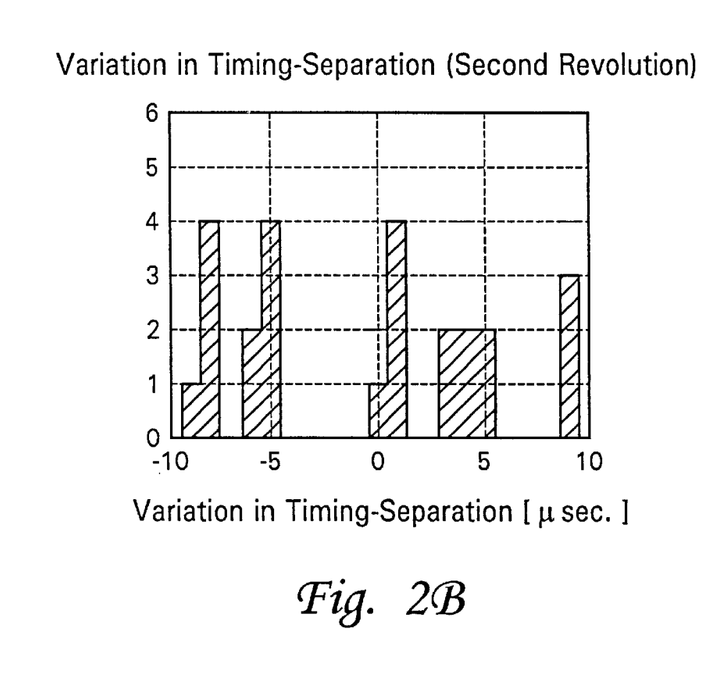
Figure 3:
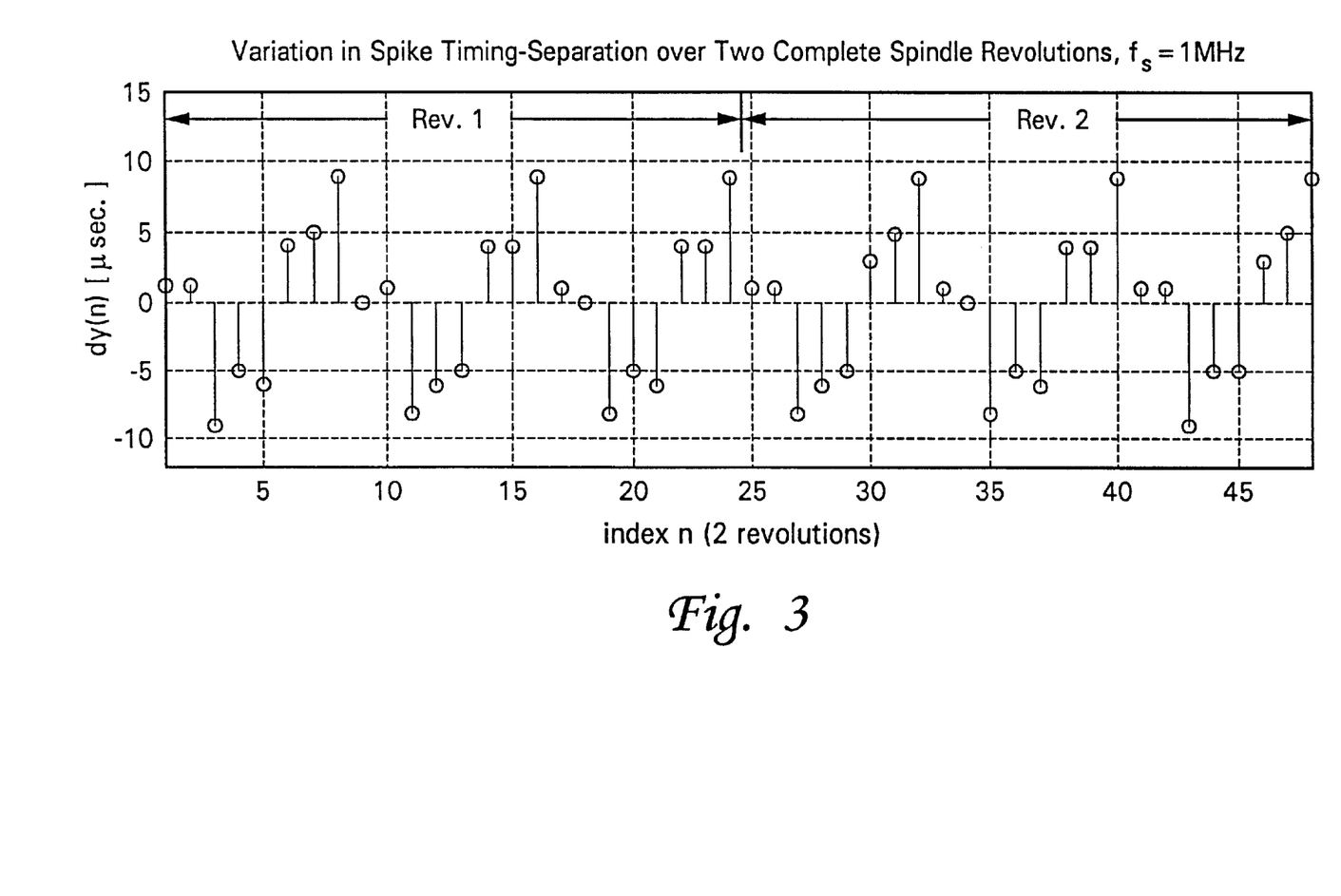
FIG. 3 is a graph depicting absolute values of the variations in timing separations, over two complete revolutions, for the same disk drive reflected in the histogram of FIG. 2.

It is possible to use a convolutional combination of this unique pattern variation (in the spike timing-separation) as a sensorless angular index. FIG. 2 shows histograms of the variation in timing-separation on a MAKO disk drive spinning at 10,000 RPM over two revolutions using a clock rate of 1 MHz, while FIG. 3 shows the absolute values of the variations in timing-separation, over two complete revolutions, for the same disk drive. The in-place variations between the two revolutions do not exceed ±1 microsecond, i.e., the clock rate resolution.

Figure 4:
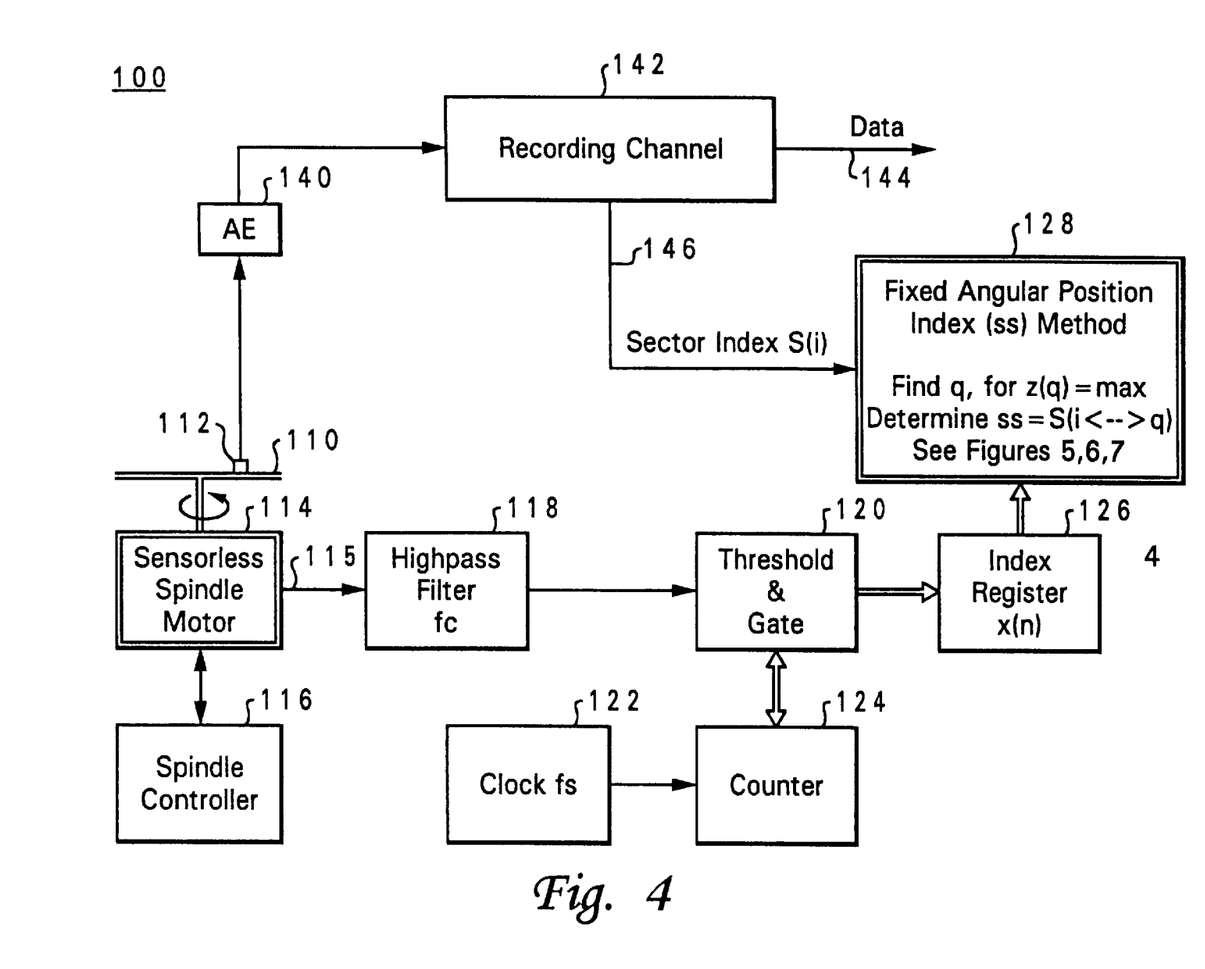
FIG. 4 is a block diagram of the hardware used, according to one implementation of the present invention, to generate a fixed angular disk position-index with a sensorless spindle motor.

Referring to FIG. 4, one method 100 of the present invention is shown for generating a fixed angular disk position-index in a DASD using a sensorless spindle motor. A spinning disk 110 with a recording head 112 is reading recorded information from the disk surface. Disk 110 is rotated by a sensorless spindle motor 114. The sensorless spindle motor 114 spins at a constant rotational velocity (RPM) under control of a spindle controller 116. A highpass filter 118 with a cutoff frequency "fc," typically around 1 MHz, has its input connected via line 115 to a center-tap or an amplifier output that sums the phase voltages of the sensorless spindle motor 114. The output of highpass filter 118 is connected to a threshold-and-gate device 120. Threshold-and-gate device 120 triggers on the leading edge of a positive or negative commutation pulse from the highpass filter 118 based on a predetermined threshold level.

A clock 122, derived from the DASD controller clock or from a separate oscillator, has a frequency "fs." The clock frequency fs is preferably about 1–5 MHz for good resolution. The clock pulses from clock 122 are counted in a counter 124. The operation of counter 124 is controlled on demand (set/reset) from the threshold-and-gate device 120. The gate function of the threshold-and-gate device 120 captures the count value x(n) of the counter 124 coincident with the leading edge of a commutation pulse, and stores it sequentially in an index register 126. Index register 126 stores N+1 values, where N is the number of commutation pulses for one full revolution. Once index register 126 is filled, the data is transferred to a software module 128, whose operation is described below in conjunction with FIGS. 5, 6 and 7.

Software module 128 also uses a sector index S(i) provided on line 146 from a recording channel 142. The recording channel 142 separates data, read by recording head 112 and filtered by the arm-electronic (AE) amplifier 140, into sector information and customer-data information. The sector index S(i) on line 146 is generated from the sector information stored in servo sectors recorded on the disk surface.

Figure 5:
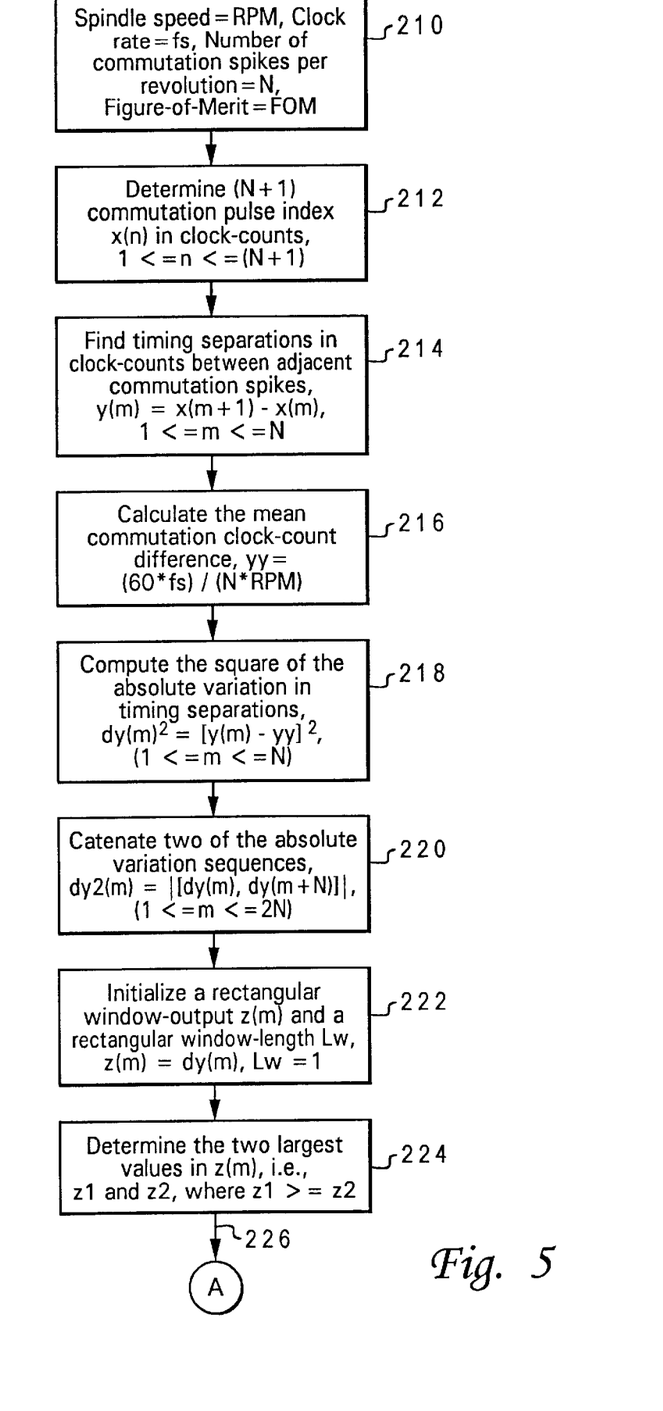
FIG. 5 is a chart illustrating a portion of the logic flow, according to the implementation of FIG. 4, for generating a fixed angular disk position-index.

Referring to FIG. 5, software module 128 begins processing at block 210 by storing the initial values of the constant spindle speed (RPM), the clock rate (fs), and the required figure-of-merit (FOM). The FOM is discussed later in connection with block 230 in FIG. 6. Block 212 uses the N+1 index values x(n) stored in the index register 126. The timing-separation sequence y(n) between adjacent index values is computed in block 214 according to the formula $y(m)=[x(m+1)-x(m)]$, where $1 \leq m \leq (N+1)$. The variation in the timing-separation dy(m) is computed by subtracting the average timing-separation yy from the sequence y(m), i.e., $dy(m)=[y(m)-yy]$. The mean value yy is computed in block 216 using $yy=(60*fs)/(N*RPM)$. In block 218, the square value of the variation of the timing-separation, i.e., $(dy(m))^2=(y(m)-yy)^2$, is calculated. To avoid the initial condition effect of a filtering operation, a sequence dy(m) is catenated to itself in block 220 such that another twice-as-long sequence $dy2(m)=[[dy(m),dy(m)]]$ is generated. Initialization of a rectangular window filter output $z(m)=dy(m)$, and a rectangular window length Lw=1, is performed in block 222. Finally, in block 224, the two largest values in z(m) are determined as z1 and z2, where z1>z2. This information is passed on line 226 to decision block 230 in FIG. 6.

The use of a rectangular window w(m) of length Lw simply facilitates the sum of a part of the timing-separation sequence dy(m) that lies within a sliding window of length Lw. This running sum (or filtered output) is designated as sequence z(m). In order to have an adequate signal-to-noise ratio (S/N); it is useful to enlarge the difference between the largest value z1 of sequence z(m) and its next largest value z2. The amount of required enlargement is determined by the figure-of-merit (FOM), where the decision criterion $FOM \leq (z1-z2)$ is made. If the criterion is satisfied, then the rectangular filter length is Lw. The filter length Lw is augmented by one if the criterion is not satisfied. Simulations show that the distribution of the filter length Lw is exponential with Lw=1 as the most likely value; see Table 1 below.

TABLE 1

Distribution of Rectangular Filter Length Lw for FOM = 5 microseconds (from 10,000 simulations)

| Lw | Probability % |
|---|---|
| 1 | 27 |
| 2 | 19 |
| 3 | 14.5 |
| 4 | 10 |
| 5 | 7 |
| 6 | 4.5 |

Figure 6:
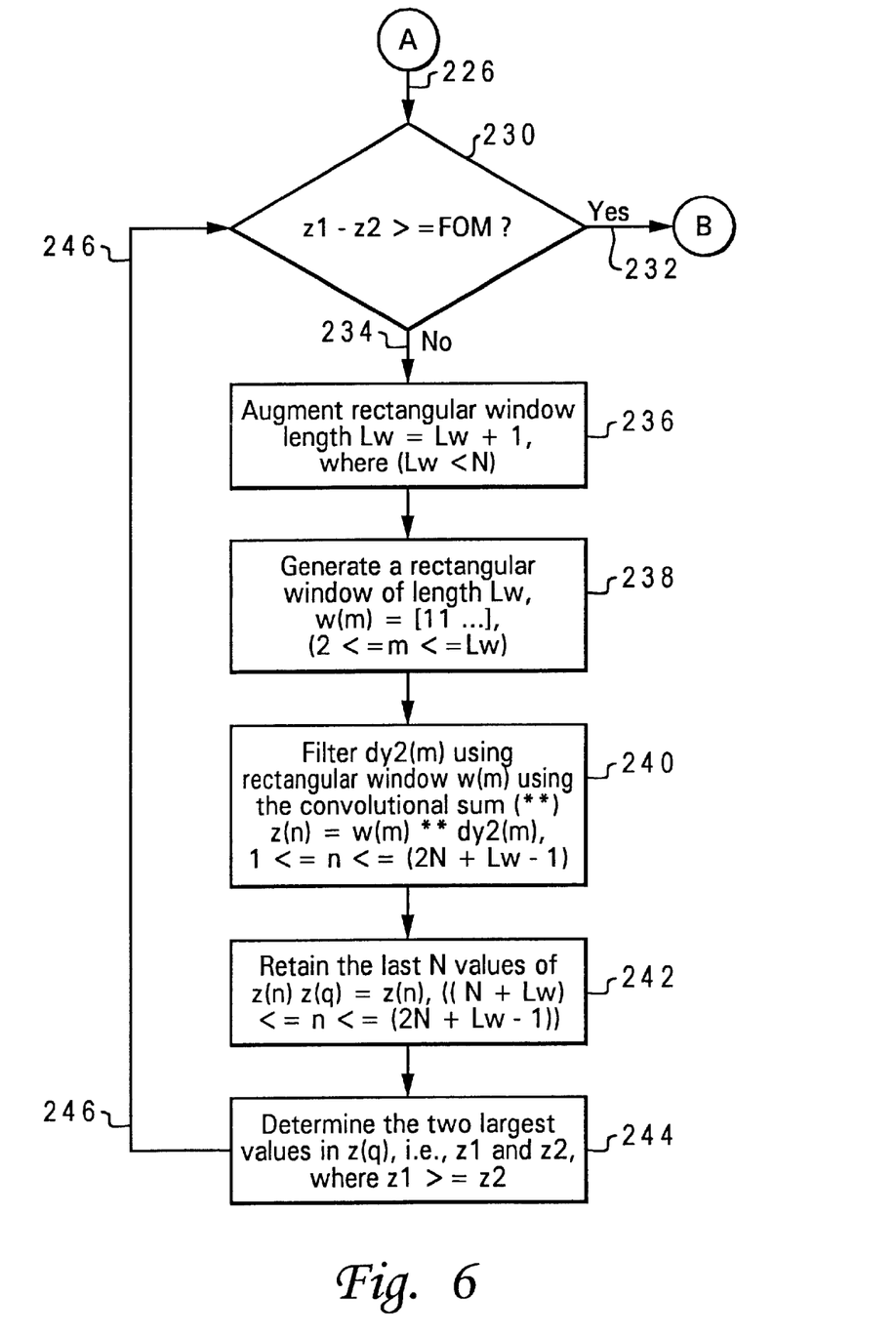
FIG. 6 is a chart continuing the logic flow of FIG. 5.

Referring to FIG. 6, the FOM criterion is tested in decision block 230 using values z1 and z2, from block 224 in FIG. 5. If the criterion is satisfied, the process does not require a rectangular filter, i.e., Lw=1, and so it is passed on line 232 to FIG. 7. Otherwise, line 234 passes information to block 236 and the rectangular filter length is increased by one, i.e., Lw=2. The 2-point rectangular window is generated in block 238, and catenated sequence dy2(m) filtered in block 240 to produce sequence z(n). Initial conditions in z(n) are eliminated in block 242 by truncation to produce z(q). The two largest values, z1 and z2, of the sequence z(q) are determined in block 244 and the results are looped on line 246 for testing against FOM criteria in block 230. If the criterion is satisfied, the process does not require a rectangular filter, i.e., Lw=2, and is again passed on line 232 to FIG. 7. If not, the process repeats the loop with Lw=3, etc. Finally, when the FOM criterion is met the process is continued in FIG. 7. If a purposeful lack of symmetry is produced in the rotor magnets, then a large deviation is possible in the variation of the timing-sequence z(q). This deviation guarantees the length Lw of the rectangular window to be small.

Figure 7:
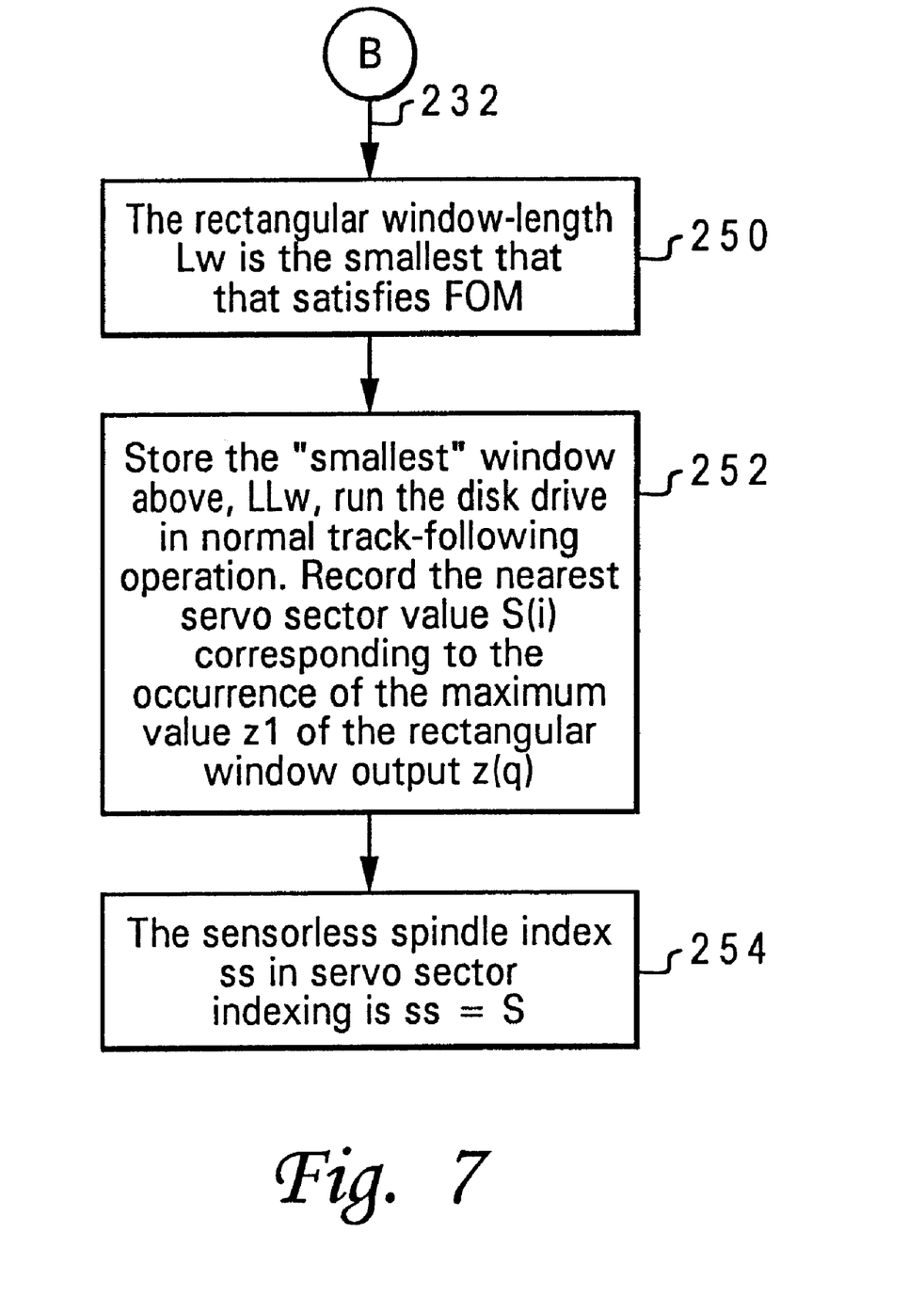
FIG. 7 is a chart continuing the logic flow of FIG. 6.

Referring now to FIG. 7, the smallest rectangular window-length LLw that satisfies the FOM is provided on line 232 and is stored in block 250. This minimum value for Lw for a given FOM is stored for reference and used during normal operation in block 252. Also in block 252, during normal operation with Lw=LLw, the absolute value of the variation in timing-separation dy(m) is filtered by a rectangular filter with length Lw=LLw. The filtered output z(q) is monitored for-a maximum value. At the occurrence of this maximum the corresponding servo sector value S(i) on line 146 in FIG. 4 is stored. This process aligns the servo sector index number with the occurrence of the filter output maximum. Thus, in the last block 254, the sensorless spindle index ss (ss=S(i) for z(q)=max) is stored for future reference.

For example, for the variation in timing-separation sequence dy(m), shown in FIG. 3, the maximum FOM is equal to two, and occurs for Lw=6 and 9. Table 2 shows the attainable FOM=(z1−z2) for different rectangular window lengths.

TABLE 2

Attainable Figure-of-Merit (FOM) for different window lengths Lw

| Lw | 2 | 3 | 4 | 5 | 6 | 7 | 8 | 9 |
|---|---|---|---|---|---|---|---|---|
| FOM | 0 | 17 | 6 | 6 | 26 | 1 | 0 | 18 |

For the MAKO example given above (FIGS. 2 and 3), the sampling rate was only 1 MHz and, therefore, the resolution is one microsecond. A higher sampling rate will give more distinction or resolution in the FOM.

Use of the sensorless spindle index method of the present invention has several advantages. First, the method allows for "just-in-time" loading in a load/unload disk drive. The invention further avoids the problem of having a disk drive loading one of the heads on top of a surface defect in the loading zone, and thereby causing more surface damage. During the final manufacturing process, the sensorless spindle index is matched up with the nearest-neighbor servo sector index. Thus, absolute rotary position is established, and the invention eliminates the need and cost for an external spindle position sensor. The present invention may be applied in other manners as well, such as use during servo track write (STW) to align the servo sector index with the sensorless spindle index, or to locate defects in the loading zone without the use of servo sectors.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of indexing a rotatable disk in a direct access storage device (DASD) having a sensorless spindle motor, comprising the steps of:

monitoring a motor voltage of the DASD to detect a pattern of commutation spike timing separations associated with the sensorless spindle motor;

identifying a sensorless spindle motor index from the commutation spike timing separations pattern; and matching the sensorless spindle motor index with a servo sector index of the disk.

2. The method of claim 1 wherein said monitoring step includes the steps of:

connecting a voltage output of the sensorless spindle motor to an input of a highpass filter; and connecting an output of the highpass filter to a threshold-and-gate device which triggers on a leading edge of a commutation pulse from the highpass filter based on a predetermined threshold level.

3. The method of claim 2 wherein said monitoring step further includes the steps of:

counting a plurality of clock pulses from a clock using a counter; and capturing a plurality of count values from the counter using the threshold-and-gate device.

4. The method of claim 3 wherein said monitoring step further includes the steps of:

the threshold-and-gate device storing the count values in an index register;

computing a timing-separation sequence between adjacent count values; and computing variations in the timing-separation sequence by subtracting an average timing-separation from the sequence.

5. The method of claim 4 wherein said identifying step includes the steps of:

setting a figure-of-merit based on a sliding window used to sum a portion of the sequence; and enlarging a difference between a largest value z1 of the sequence and a next largest value z2 of the sequence based on the figure-of-merit (FOM).

6. The method of claim 5 wherein said identifying step further includes the steps of:

determining that FOM>(z1−z2); and in response to said determining step, increasing a length of the sliding window.

7. The method of claim 1 further comprising the step of placing rotor magnets of the sensorless spindle motor in an asymmetric fashion.

8. The method of claim 1 wherein said matching step includes the steps of:

determining a maximum value for variations in the commutation spike timing separations; and storing a servo sector value corresponding to the maximum value.

9. The method of claim 1 wherein said matching step occurs during servo track write for the disk.

10. An apparatus for indexing a rotatable disk in a direct access storage device (DASD) with a sensorless spindle motor, comprising:

means for monitoring a motor voltage of the DASD to detect a pattern of commutation spike timing separations associated with the sensorless spindle motor;

means for identifying a sensorless spindle motor index from the commutation spike timing separations pattern; and means for matching the sensorless spindle motor index with a servo sector index of the disk.

11. The apparatus of claim 10 wherein said monitoring means includes:

a highpass filter having an input connected to a voltage output of the sensorless spindle motor; and a threshold-and-gate device connected to an output of said highpass filter, said threshold-and-gate device triggering on a leading edge of a commutation pulse from said highpass filter based on a predetermined threshold level.

12. The apparatus of claim 11 wherein said monitoring means further includes:

a clock;

a counter for counting a plurality of clock pulses from said clock; and means for capturing a plurality of count values from the counter using said threshold-and-gate device.

13. The apparatus of claim 12 wherein said monitoring means further includes:

an index register for storing the count values from said threshold-and-gate device;

means for computing a timing-separation sequence between adjacent count values; and means for computing variations in the timing-separation sequence by subtracting an average timing-separation from the sequence.

14. The apparatus of claim 13 wherein said identifying means includes:

means for setting a figure-of-merit based on a sliding window used to sum a portion of the sequence; and means for enlarging a difference between a largest value z1 of the sequence and a next largest value z2 of the sequence based on the figure-of-merit (FOM).

15. The apparatus of claim 10 wherein said identifying means determines that FOM>(z1−z2) and, in response to this determination, increases a length of the sliding window.

16. The apparatus of claim 10 wherein rotor magnets of the sensorless spindle motor are arranged in an asymmetric fashion.

17. The apparatus of claim 10 wherein said matching means includes:

means for determining a maximum value for variations in the commutation spike timing separations; and means for storing a servo sector value corresponding to the maximum value.

* * * * *